United States Patent
Van Der Schaar-Mitrea

(10) Patent No.: US 6,577,773 B1
(45) Date of Patent: Jun. 10, 2003

(54) METHOD AND ARRANGEMENT FOR QUANTIZING DATA

(75) Inventor: Mihaela Van Der Schaar-Mitrea, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/488,030

(22) Filed: Jan. 20, 2000

(30) Foreign Application Priority Data

Jan. 21, 1999 (EP) .......................................... 99200160

(51) Int. Cl.⁷ ................................................ G06K 9/36
(52) U.S. Cl. .................................. 382/251; 374/240.03
(58) Field of Search ................................. 382/232–251; 375/240–241

(56) References Cited

U.S. PATENT DOCUMENTS 5,663,763 A * 9/1997 Yagasaki et al. ............ 382/251
5,790,705 A * 8/1998 Anderson et al. ........... 382/251
6,477,276 B1 * 11/2002 Inoue et al. ................. 382/251

OTHER PUBLICATIONS

Ahn Y. et al: "Quantization Error Analysis of the RADIX–4 Signed–Digit Arithmetic" Midwest Symposium on Circuits and Systems, US, New York, IEEE 1998, pp. 1407–1410.

"An MPEG Decoder With Embedded Compression for Memory Reduction", IEEE Transactions on Consumer Electronics, vol. 44, No. 3, Aug. 1998.

* cited by examiner

Primary Examiner—Jingge Wu
(74) Attorney, Agent, or Firm—Russell Gross

(57) ABSTRACT

A quantizer is disclosed in which the quantization errors are symmetrically divided around the respective reconstruction levels. The quantizer prevents quantization errors from accumulating when the quantizer operates in a recursive loop. This is important if such a quantizer is used, inter alia, for compressing image data in the prediction loop of an MPEG decoder. The quantizer prevents such a decoder from drifting away from the encoder's local prediction loop.

5 Claims, 3 Drawing Sheets

METHOD AND ARRANGEMENT FOR QUANTIZING DATA

FIELD OF THE INVENTION

The invention relates to a method and arrangement for quantizing data values with a given quantization step size.

BACKGROUND OF THE INVENTION

A known method of quantizing data values is disclosed in "An MPEG decoder with Embedded Compression for Memory Reduction", IEEE Transactions on Consumer Electronics, Vol. 44, No. 3, August 1998. Herein, a data compressor including a quantizer is used to efficiently store pictures that are required for decoding subsequent pictures. In such a system, which includes a repetitive encoding-decoding loop, quantization errors can accumulate if the quantization errors are not symmetric about zero. To avoid this, a robust quantization scheme is disclosed in FIG. 7 (right) of the IEEE publication.

However, it has been found that the robust quantization scheme appears to be robust only for one of the disclosed compression strategies, viz. the block-predictive coding which is performed in the spatial domain. The quantization scheme is not robust if the image is compressed in the frequency domain, i.e. if it is subjected to an orthogonal transform such as the Discrete Cosine Transform (DCT), and quantization is applied to the transform coefficients.

OBJECT AND SUMMARY OF THE INVENTION

It is an object of the invention to provide a quantization scheme that is also robust in the transform domain.

This is achieved by the method as claimed in claim 1 and the corresponding arrangement claim 4. Advantageous embodiments of the invention are defined in the dependent claims.

The invention is based on the recognition that symmetry with respect to the level zero is not sufficient. A quantizer is robust in the DCT domain if the quantization errors are symmetric with respect to each reconstruction level. Conventional quantizers, which simply round data values to the nearest integral multiple of the step size, exhibit this desired behavior for, odd step sizes. The invention provides this feature also for even step sizes. Even step sizes, particularly powers of 2, are often used in low-cost quantizers because it reduces the quantization process to simple shift operations.

DESCRIPTION OF PREFERRED EMBODIMENTS

Figure 1:
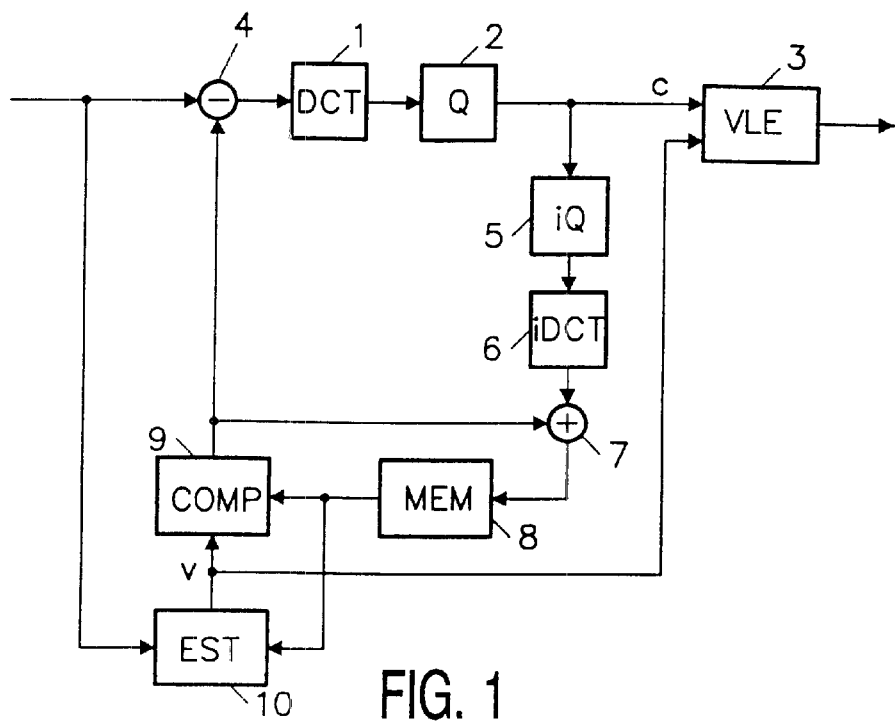
FIG. 1 shows schematically an MPEG video encoder in which the method in accordance with the invention is used.

FIG. 1 shows an MPEG video encoder in which the method in accordance with the invention can be used advantageously. The encoder is well known in the art and will only be described briefly. The encoder receives a video signal comprising a sequence of images, some of which are to be intraframe-coded (I-pictures) and others are to be predictively coded (P and B-pictures). I-pictures are directly applied to a Discrete Cosine Transformer (DCT) 1 which divides the picture into blocks of 8*8 pixels and transforms each block into frequency coefficients. The coefficients are applied to a quantizer 2, and the quantized coefficients c are entropy-coded by a variable-length encoder 3. P and B-pictures are predictively encoded. In this mode, a motion-compensated prediction image is subtracted (4) from the input image, and the DCT and quantizing operations are applied to the difference image. The prediction image is derived from one (P) or two (B) previously encoded pictures. To this end, the encoder includes a local decoder comprising an inverse quantizer 5, an inverse DCT 6, an adder 7, a picture store 8, and a motion compensation stage 9. A motion estimator 10 estimates the amount of motion between the input image and the previously encoded image(s). Motion vectors v being indicative of said motion are applied to the motion compensation stage 9 and, after encoding by the variable-length encoder 3, transmitted along with the coefficients c.

Figure 2:
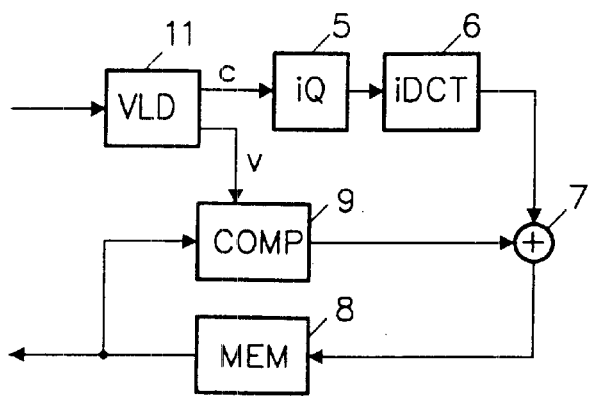
FIG. 2 shows schematically an MPEG video decoder in which the method in accordance with the invention is used.

FIG. 2 shows an MPEG video decoder in which the method in accordance with the invention can be used advantageously. The decoder comprises a variable-length decoder 11 to retrieve the quantized coefficients c and motion vectors v. The rest of the decoder is similar to the local decoder of the encoder described above. That is, the decoder comprises the same inverse quantizer 5, inverse DCT 6, adder 7, picture store 8, and motion compensation stage 9, as the encoder which is shown in FIG. 1.

Figure 3:
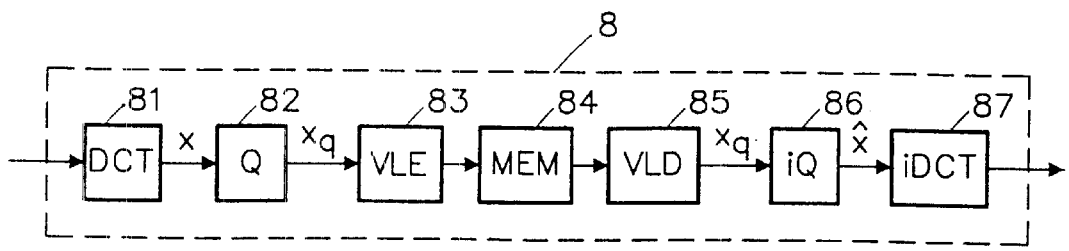
FIG. 3 shows schematically a data compression circuit including a quantizer in accordance with the invention, for use in the video encoder shown in FIG. 1 or in the video decoder shown in FIG. 2.

The invention addresses one aspect of the storage of pictures in picture store 8. As disclosed in the prior art, the pictures are stored in compressed form so as to save memory capacity and allow the memory to be embedded on the same chip area. This is also referred to as "embedded compression". Here, the embedded compression is carried out in the DCT domain. The picture store 8 in FIGS. 1 and 2 is implemented as schematically shown in FIG. 3. This codec (coding-decoding circuit) comprises a DCT 81 which may be simpler than the encoder's DCT 1 in (FIG. 1). For example, it may be a 4*4 DCT and provide 9-bits integral coefficient values. The codec further comprises a quantizer 82, an entropy encoder 83, and a memory 84 in which the compressed image data are stored. A decoder 85, inverse quantizer 86, and inverse DCT 87 perform the inverse operations of entropy encoder 83, quantizer 82, and DCT 81, respectively. With this codec, a fixed compression factor of 4 can be achieved.

The quantizer 82 shown in FIG. 3 receives the integral coefficient values x from DCT 81, and represents them by respective quantized coefficients $x_q$ in accordance with a given quantization step size q. The inverse quantizer 86 multiplies each quantized coefficient $x_q$ with the respective step size q and produces the reconstruction level $\hat{x}=q \times x_q$. An important aspect of embedded compression in predictive systems as referred to above is that the quantization errors $(x-\hat{x})$ introduced by the quantizer 82 do not accumulate. To this end, the quantizer is arranged in such a way that quantization errors are always symmetrically distributed around the respective reconstruction level. For odd step sizes, this is automatically achieved by rounding each coefficient to the nearest integral multiple of the step size. However, the step size q used in low-cost codecs is often a power of 2, i.e. an even number.

Figure 4:
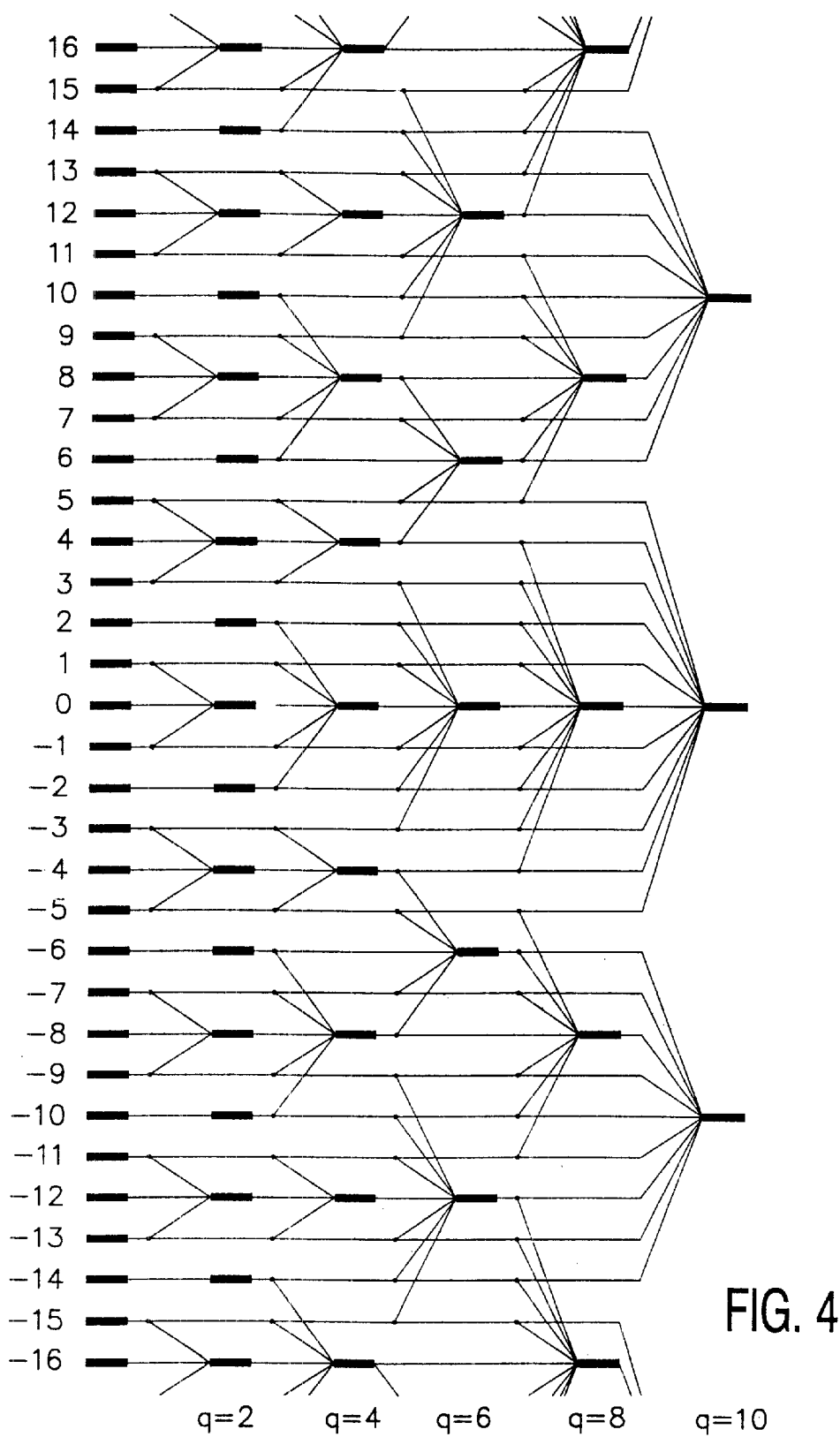
FIG. 4 shows a diagram of quantization levels to illustrate the operation of the quantizer which is shown in FIG. 3.

FIG. 4 shows a diagram to illustrate the operation of quantizer 82 in accordance with the invention. The first vertical column of black rectangles denotes the integral DCT coefficient values x that are applied to the quantizer. The black rectangles in the subsequent columns show the quantization levels x̂ for a plurality of even step sizes q=2, q=4, q=6, q=8, and q=10. As the Figure clearly shows, the input values x that are mapped to the same reconstruction level x̂ are now symmetrically divided above and below said level. Consequently, the quantization errors (x−x̂) are also symmetrically distributed. For example, in the column q=4 in FIG. 4, the quantization errors associated with x̂=4 are in the symmetric range (−1,+1), and the quantization errors associated with x̂=8 are in the symmetric range (−2,+2).

FIG. 4 shows only a small range of input values and step sizes. More generally, the reconstruction levels x̂ of the quantizer can be mathematically expressed as:

$$\hat{x} = q \times \left\lfloor \frac{x+A}{q} \right\rfloor,$$

where $$A = \begin{cases} 0, & \text{if } x \bmod q = 0 \\ -x \bmod 2q, & \text{if } 0 < x \bmod 2q \le \frac{q}{2} \\ q - x \bmod q, & \text{if } \frac{q}{2} < x \bmod 2q < q \\ -x \bmod q, & \text{if } q < x \bmod 2q < \frac{3q}{2} \\ 2q - x \bmod 2q, & \text{if } \frac{3q}{2} \le x \bmod 2q < 2q \end{cases} \quad (\text{Eq. 1})$$

and ⌊ ⌋ denotes rounding down to the nearest integral.

Figure 5:
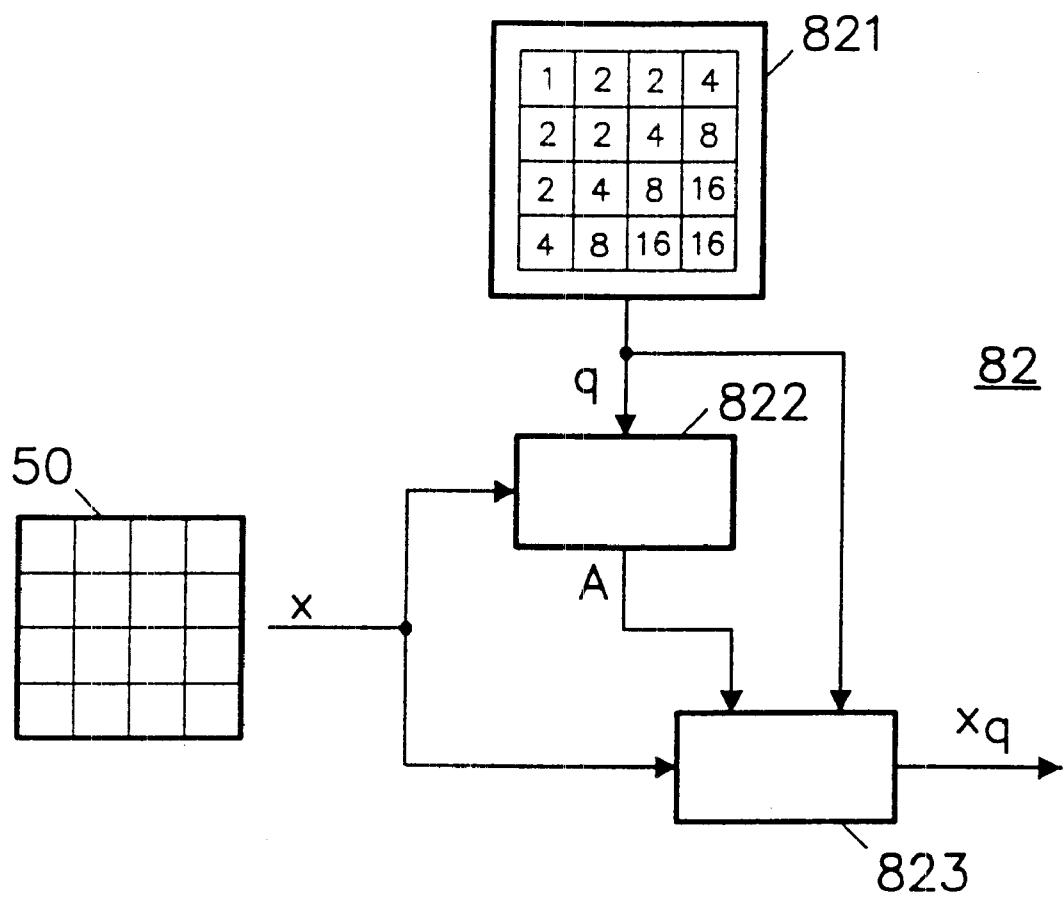
FIG. 5 shows schematically an embodiment of the quantizer which is shown in FIG. 3.

FIG. 5 shows schematically an embodiment of the quantizer 82. The quantizer receives a block 50 of 4*4 transform coefficients from DCT 81 (FIG. 3). Each coefficient x is quantized with a step size q stored in a corresponding location of a quantization matrix 821. A comparator circuit 822 receives the coefficient x and step size q, and determines which of the conditions specified in Eq. 1 is fulfilled. The result A is applied to calculation stage 823 which calculates $x_q$ in accordance with:

$$x_q = \left\lfloor \frac{x+A}{q} \right\rfloor.$$

The invention is not only useful in systems employing the MPEG or H.263 standard for motion video, but also in other systems such as JPEG for still images and digital video recorder systems. The invention is particularly useful in MPEG4 because MEPG4 often uses long GOPs (Groups of Pictures) having one I-picture and up to 200 P-pictures, where accumulation of errors is an important aspect.

In summary, a quantizer is disclosed in which the quantization errors are symmetrically divided around the respective reconstruction levels. The quantizer prevents quantization error from accumulating when the quantizer operates in a recursive loop. This is important if such a quantizer is used, inter alia, for compressing image data in the prediction loop of an MPEG decoder. The quantizer prevent such a decoder from drifting away from the encoder's local prediction loop.

What is claimed is:

1. A method of quantizing data values x with a given quantization step size q to obtain reconstruction values x̂, characterized in that the quantization errors (x−x̂) are symmetrically distributed with respect to the respective reconstruction level x̂ for even step sizes q, wherein the data values are quantized in accordance with:

$$\hat{x} = q \times \left\lfloor \frac{x+A}{q} \right\rfloor,$$

where q is even, and $$A = \begin{cases} 0, & \text{if } x \bmod q = 0 \\ -x \bmod 2q, & \text{if } 0 < x \bmod 2q \le \frac{q}{2} \\ q - x \bmod q, & \text{if } \frac{q}{2} < x \bmod 2q < q \\ -x \bmod q, & \text{if } q < x \bmod 2q < \frac{3q}{2} \\ 2q - x \bmod 2q, & \text{if } \frac{3q}{2} \le x \bmod 2q < 2q \end{cases}.$$

2. A method as claimed in claim 1, wherein the step size q is a power of 2.

3. A quantizer (82) for quantizing data values x with a given quantization step size q to quantized reconstruction values x̂, characterized in that the quantization errors (x−x̂) are symmetrically distributed with respect to the respective reconstruction level x̂ for even step sizes q, wherein the data values are quantized in accordance with:

$$\hat{x} = q \times \left\lfloor \frac{x+A}{q} \right\rfloor,$$

where q is even and $$A = \begin{cases} 0, & \text{if } x \bmod q = 0 \\ -x \bmod 2q, & \text{if } 0 < x \bmod 2q \le \frac{q}{2} \\ q - x \bmod q, & \text{if } \frac{q}{2} < x \bmod 2q < q \\ -x \bmod q, & \text{if } q < x \bmod 2q < \frac{3q}{2} \\ 2q - x \bmod 2q, & \text{if } \frac{3q}{2} \le x \bmod 2q < 2q \end{cases}.$$

4. An encoder for predictively encoding data, comprising compression and storage means (8) for storing previously encoded data in a compressed format, characterized in that the compression means include a quantizer (82) as claimed in claim 3.

5. A decoder for decoding predictively encoded data, comprising compression and storage means (8) for storing previously decoded data in a compressed format, characterized in that the compression means include a quantizer (82) as claimed in claim 3.

* * * * *